(12) United States Patent
Diawara et al.

(10) Patent No.: US 8,153,988 B2
(45) Date of Patent: Apr. 10, 2012

(54) POROUS MATERIAL NEUTRON DETECTOR

(75) Inventors: Yacouba Diawara, Oak Ridge, TN (US); Menyhert Kocsis, Venon (FR)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/844,960

(22) Filed: Jul. 28, 2010

(65) Prior Publication Data

US 2012/0025090 A1 Feb. 2, 2012

(51) Int. Cl.
*G01T 3/06* (2006.01)
(52) U.S. Cl. .................................................. 250/390.11
(58) Field of Classification Search ........ 250/390.01–390.12, 391–395
See application file for complete search history.

(56) References Cited

U.S. PATENT DOCUMENTS

| | | | | |
|---|---|---|---|---|
| 5,973,328 | A * | 10/1999 | Hiller et al. | 250/390.01 |
| 2005/0269501 | A1 * | 12/2005 | Esin et al. | 250/282 |
| 2006/0054863 | A1 * | 3/2006 | Dai et al. | 252/301.4 R |
| 2007/0085010 | A1 * | 4/2007 | Letant et al. | 250/361 R |

OTHER PUBLICATIONS

Diawara, Y. et al., "Novel, Photon Counting Detectors for X-Ray Diffraction Applications" *Proceedings of SPIE* (2002) pp. 359-364, vol. 4784.
Hargrove, C.K. et al., "Use of Gd in Gas Counters as Neutron Detectors in SNO" *Nuclear Instruments and Methods in Physics Research* (1995) pp. 157-169, vol. 357.
The Webpage, Nova Scientific Inc., http://www.novascientific.com/nextgen.html retrieved on Jul. 30, 2010.
Blum, W. et al., "Particle Detection with Drift Chambers" *Springler Verlag* (1994) ISBN: 3-540-58322-X, p. 71.
Abeles, B. et al., "Structural and Electrical Properties of Granular Metal Films" *Advanced Physics* (1975) pp. 407-461, vol. 24.
Sauli, F., "Principle of Operation of Multiwire Proportional and Drift Chambers" *Lectures given in the Academic Training Programme of CERN* (1977) CERN 77-09.
Sauli, F., "GEM: A New Concept for Electron Amplification in Gas Detectors" *Nuclear Instruments and Methods in Physics Research* (1997) pp. 531-534, vol. 386.
Oed, A., "Position-Sensitive Detector with Microstrip Anode for Electron Multiplication with Gases" *Nuclear Instruments and Methods in Physics Research* (1988) pp. 351-359, vol. 263.
Angelini, F. et al., "The Micro-Gap Chamber" *Nuclear Instruments and Methods in Physics Research* (1993) pp. 69-77, vol. 335.
Bartol, F. et al., "The C.A.T. Pixel Proportional Gas Counter Detector" *Journal of Physics III France* (1996) pp. 337-347, vol. 6.

(Continued)

*Primary Examiner* — Kiho Kim
(74) *Attorney, Agent, or Firm* — Scully, Scott, Murphy & Presser, P.C.

(57) ABSTRACT

A neutron detector employs a porous material layer including pores between nanoparticles. The composition of the nanoparticles is selected to cause emission of electrons upon detection of a neutron. The nanoparticles have a maximum dimension that is in the range from 0.1 micron to 1 millimeter, and can be sintered with pores thereamongst. A passing radiation generates electrons at one or more nanoparticles, some of which are scattered into a pore and directed toward a direction opposite to the applied electrical field. These electrons travel through the pore and collide with additional nanoparticles, which generate more electrons. The electrons are amplified in a cascade reaction that occurs along the pores behind the initial detection point. An electron amplification device may be placed behind the porous material layer to further amplify the electrons exiting the porous material layer.

42 Claims, 12 Drawing Sheets

OTHER PUBLICATIONS

Giomataris, Y., "Development and Prospects of the New Gaseous Detector "Micromegas"" *Nuclear Instruments and Methods in Physics Research* (1998) pp. 239-250, vol. 419.

Akindinov, A.N. et al., "Space Charge Limited Avalanche Growth in Multigap resistive Plate Chambers" *European Physics of J C* (2004) pp. s325-s331, vol. 34(s01).

* cited by examiner

POROUS MATERIAL NEUTRON DETECTOR

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in this invention.

FIELD OF THE INVENTION

The present invention relates to a neutron detector, and particularly to a neutron detector employing a porous material to enhance the detection sensitivity, and methods of operating the same.

BACKGROUND OF THE INVENTION

Neutrons can be detected by the gamma ray radiation that is emitted during a neutron capture. The absorption neutron cross-section of an isotope of a chemical element is the effective cross sectional area that an atom of that isotope presents to absorption, and is a measure of the probability of neutron capture. It is usually measured in barns (b). 1 barn is equal to $10^{-28}$ m$^2$.

The neutron temperature, also called the neutron energy, indicates a free neutron's kinetic energy, usually given in electron volts. The term temperature is used, since hot, thermal and cold neutrons are moderated in a medium with a certain temperature. The neutron energy distribution is then adopted to the Maxwellian distribution as known for thermal motion. Qualitatively, the higher the temperature, the higher the kinetic energy is of the free neutron. Kinetic energy, speed and wavelength of the neutron are related through the De Broglie relation. Fast neutrons have a kinetic energy greater than 1 eV. Slow neutrons have a kinetic energy less than or equal 0.4 eV. Thermal neutrons have a kinetic energy of about 0.025 eV. Cold neutrons have a kinetic energy from $5 \times 10^{-5}$ eV to 0.025 eV.

Total neutron capture cross-sectional area, or absorption cross-sectional area, is the effective cross-sectional area associated with the capture of neutron by a single atom. The total neutron capture cross-sectional area is often highly dependent on neutron energy. Referring to FIGS. 1A-1I, the total neutron capture cross-sectional area as a function of incident neutron energy is plotted for $^6$Li, $^7$Li, $^{10}$B, $^{11}$B, $^{113}$Cd, $^{174}$Hf, $^{177}$Hf, $^{155}$Gd, and $^{157}$Gd. These graphs are available at a web page entitled "Evaluated Nuclear Data File (ENDF) Retrieval & Plotting," http://www.nndc.bnl.gov/sigma/index.jsp (Last visited Jun. 22, 2010). $^6$Li, $^{10}$B, $^{113}$Cd, $^{174}$Hf, $^{177}$Hf, $^{155}$Gd, and $^{157}$Gd are "thermal-neutron absorbing materials," which are materials having a total neutron capture cross-sectional area greater than $10^3$ barns at 0.0025 eV. $^7$Li and $^{11}$B have a much smaller total neutron capture cross-sectional area than $^6$Li and $^{10}$B, respectively, illustrating that the total neutron capture cross-sectional area can vary significantly from isotope to isotope.

Examples of electromagnetic radiation than can be detected by generation of electrons include X-rays and gamma rays. Upon impinging on a matter, an X-ray or a gamma ray ionizes the matter and generates secondary electrons. In this case, the X-ray or the gamma ray can be detected by the electrons generated by the ionization upon interaction with matter.

In general, electrons generated either by zero rest mass particles (photons in the X-ray range or in the gamma ray range) or non-zero rest mass particles (such as neutrons) can be detected by a detector configured to detect the electrons that the particle generates. A common variety is a gaseous detector, which has a number of very attractive features for neutron scattering including large active area, direct conversion process, low noise and high count rate capability. However, the spatial resolution and the parallax errors of conventional gaseous neutron detectors are fundamentally limited respectively by the particle (protons and tritons) range and the conversion volume design. When a neutron is absorbed in the conversion region of the gaseous detector, charged particles are produced. These charged particles travel through the gas producing gas ionization. The range of these particles sets the spatial resolution of the detector (typically in the order of mm range) while the average number of the primary released electrons (typically of order about 30,000) determines the energy resolution. The parallax broadening occurs in all non spherical gas conversion regions where signal electrons always drift perpendicularly to the electrodes.

An elegant way to overcome these difficulties is to replace the converter from gaseous absorber to a condensed matter. A solid state with a direct conversion capability will offer all the advantages of the gaseous while reducing the spatial resolution and the parallax. Solid state neutron converter approach has been used to produce vacuum-based neutron detectors using either solid or porous materials, and they provided a better spatial resolution than a conventional gaseous detector. But solid neutron converters suffer from relatively low quantum efficiency (typically a few percent) in the neutron energy range of interest (meV-MeV range). This is due to the fact that a neutron solid converter must be relatively thick (of order tens of microns) to efficiently absorb the neutron in this range. However, the thermalization range of the electrons produced by neutron absorption is in the micron range. Thus, most of these electrons thermalize and are trapped in the converter materials. Prior art porous converters have also been successfully integrated in the current generation of vacuum-based detectors, but they suffer from several performance limitations which are inherent to the fabrication process: limited sensitive areas, limited count rates capabilities (10,000 cps/mm$^2$) and relatively poor pulse height resolution.

SUMMARY OF THE INVENTION

A neutron detector employs a porous material layer that includes pores between nanoparticles. The composition of the nanoparticles is selected to cause emission of electrons upon detection of a neutron. The nanoparticles have a maximum dimension that is in the range from 1 nm to 1 micron, and can be sintered with pores thereamongst to form the porous material layer. A passing radiation generates electrons at one or more nanoparticles, some of which are scattered into a pore and directed toward a direction opposite to the applied electrical field. These electrons travel through the pore and collide with additional nanoparticles, which generate more electrons. The electrons are amplified in a cascade reaction that occurs along the pores behind the initial detection point. An electron amplification device may be placed behind the porous material layer to further amplify the electrons exiting the porous material layer. The amplification device may include a multiplication chamber that amplifies the electrons from the porous material layer in a high electric field. A resistive screen, made of high work function material that has a work function greater than 4.0 eV, may be employed to reduce back scattering of secondary electrons from an anode screen.

According to an aspect of the present invention, a neutron detector is provided, which includes a porous material layer that includes nanoparticles and pores thereamongst, wherein the nanoparticles include a thermal-neutron absorbing material.

According to another aspect of the present invention, a method of detecting a neutron is provided, which includes: providing a neutron detector including a porous material layer including nanoparticles and pores thereamongst, wherein the nanoparticles is composed of a thermal-neutron absorbing material; and detecting a neutron by exposing the neutron detector to the neutron.

DETAILED DESCRIPTION OF THE INVENTION

Figure 1A:
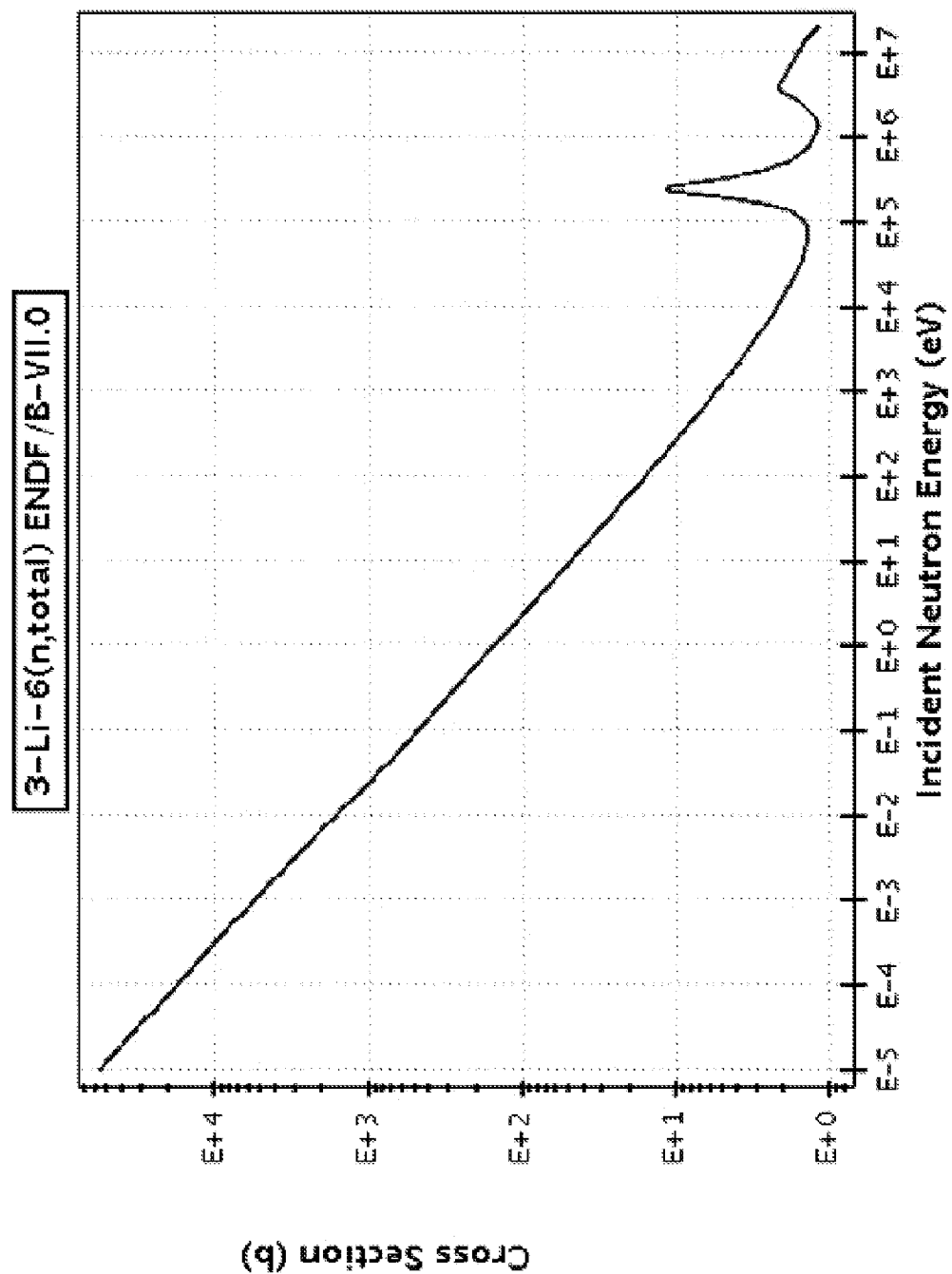
FIG. 1A is a graph of a total neutron capture cross-sectional area as a function of incident neutron energy for $^6$Li.
Figure 1B:
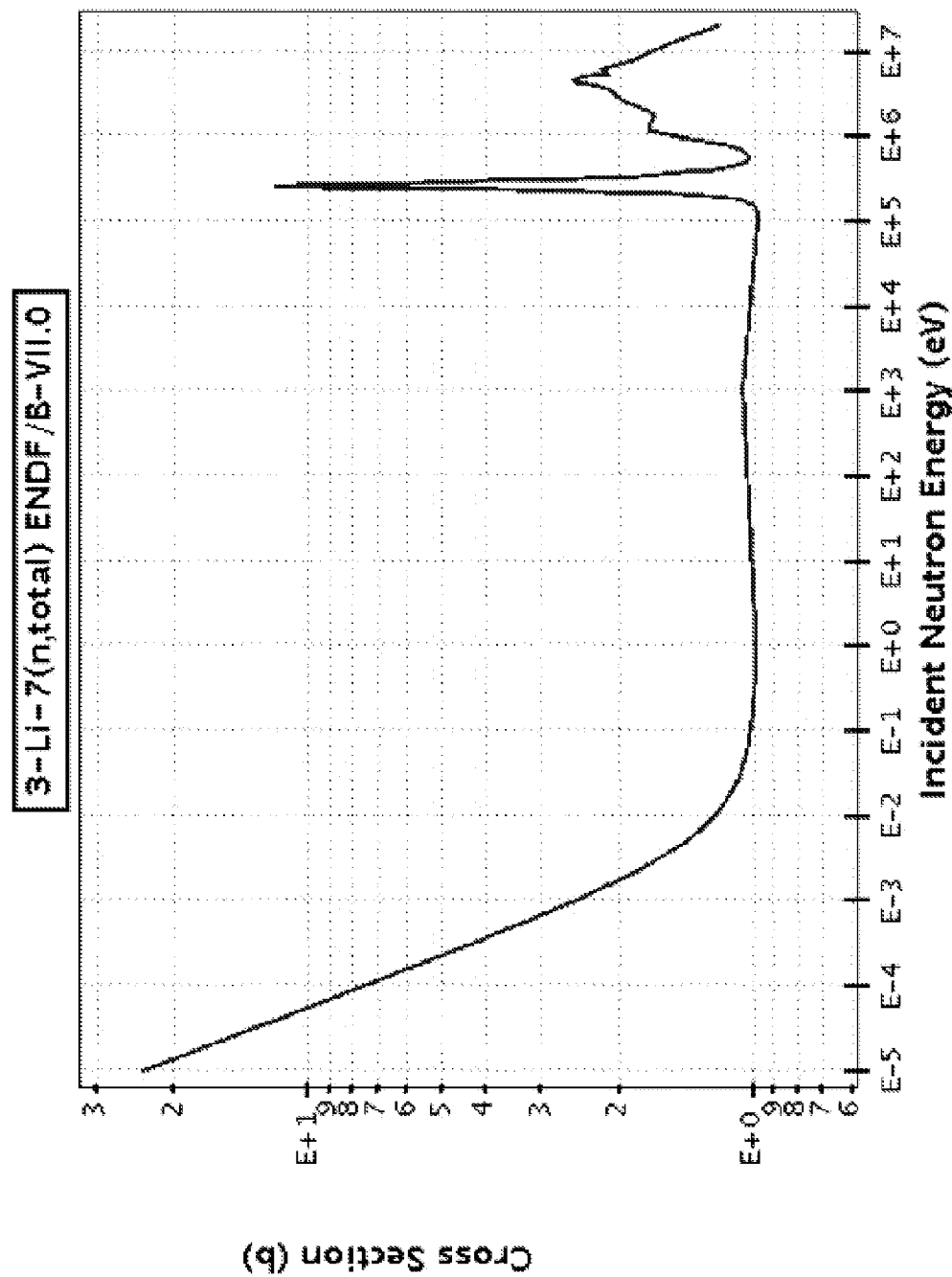
FIG. 1B is a graph of a total neutron capture cross-sectional area as a function of incident neutron energy for $^7$Li.
Figure 1C:
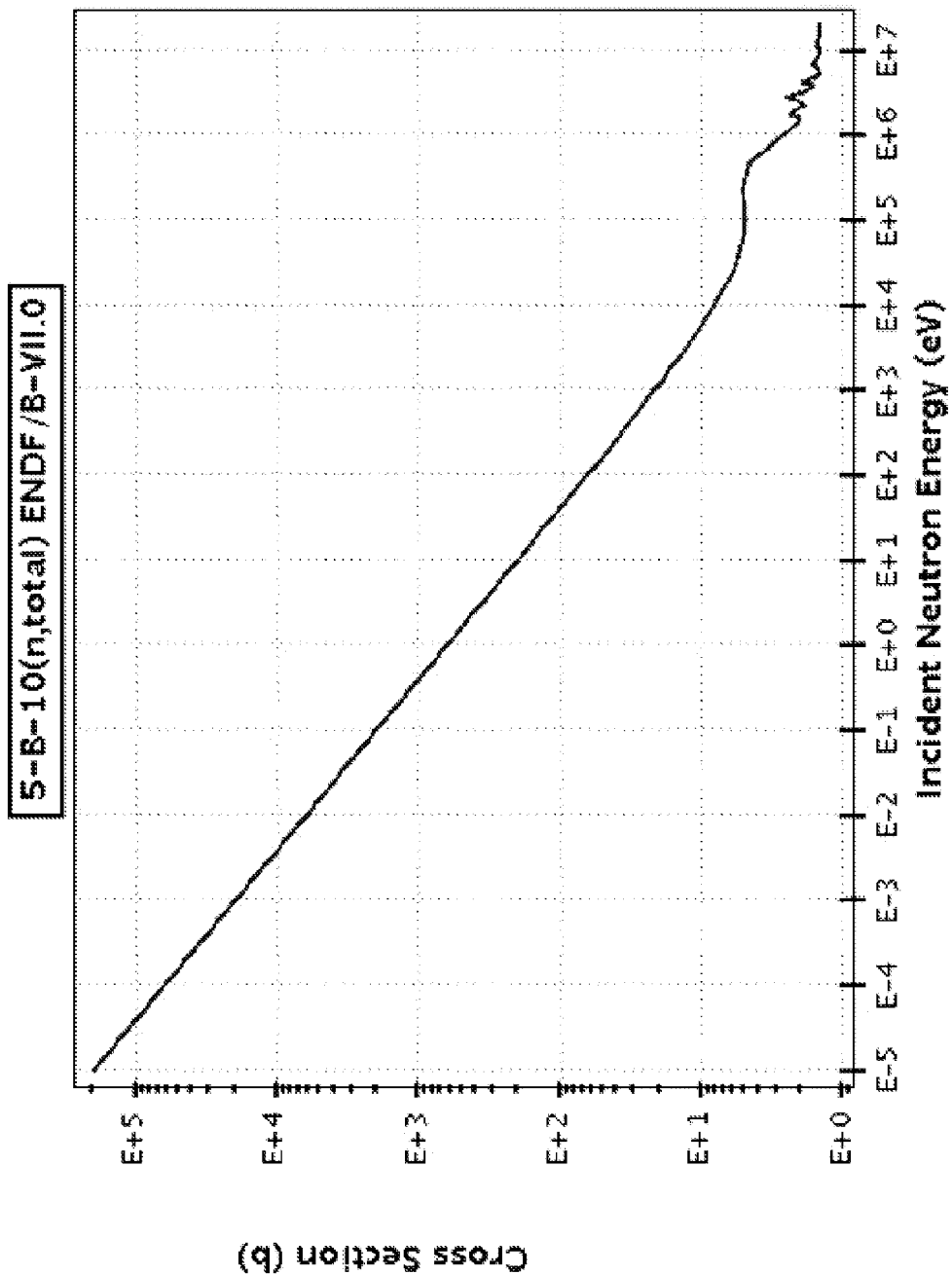
FIG. 1C is a graph of a total neutron capture cross-sectional area as a function of incident neutron energy for $^{10}$B.
Figure 1D:
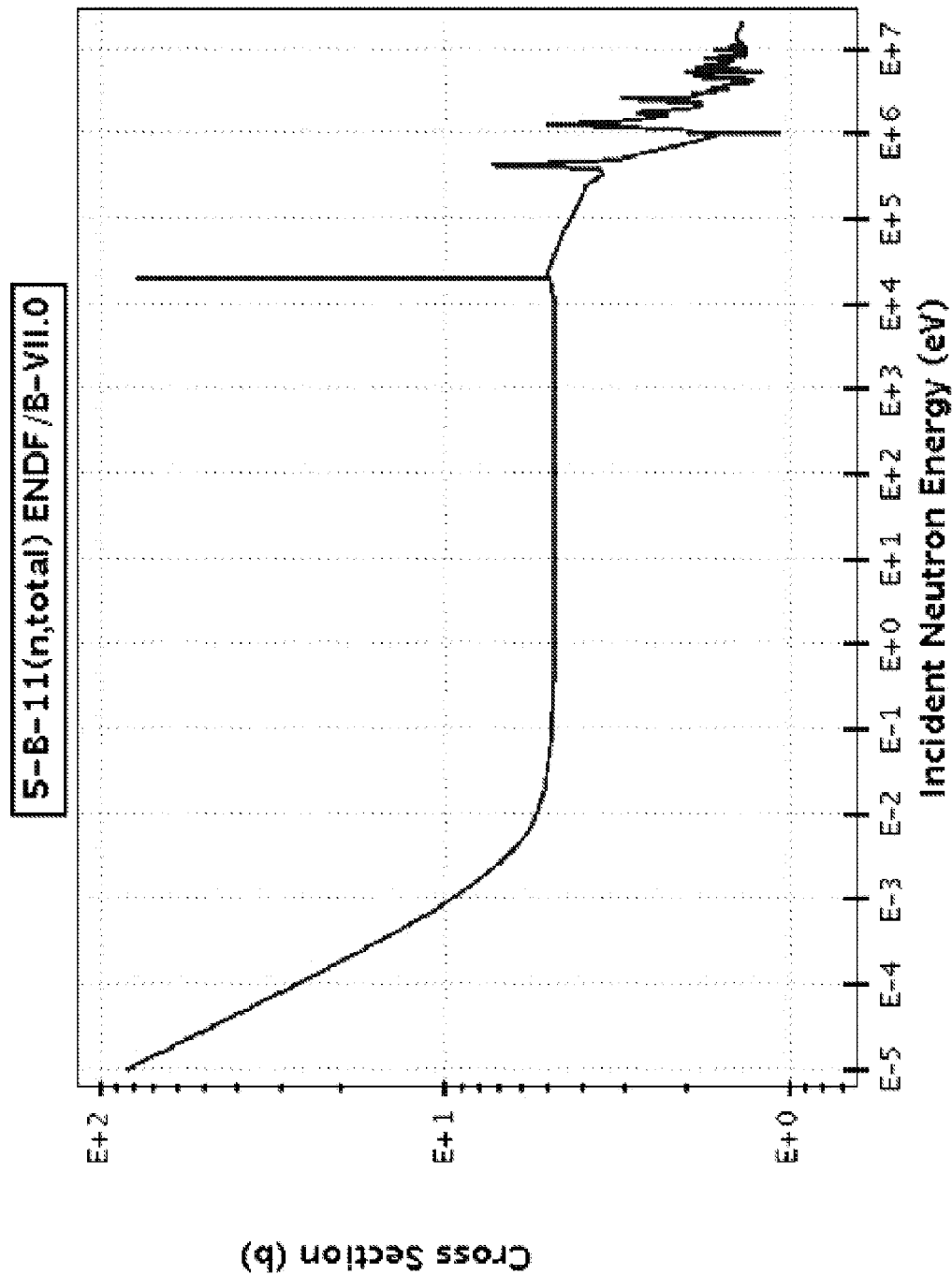
FIG. 1D is a graph of a total neutron capture cross-sectional area as a function of incident neutron energy for $^{11}$B.
Figure 1E:
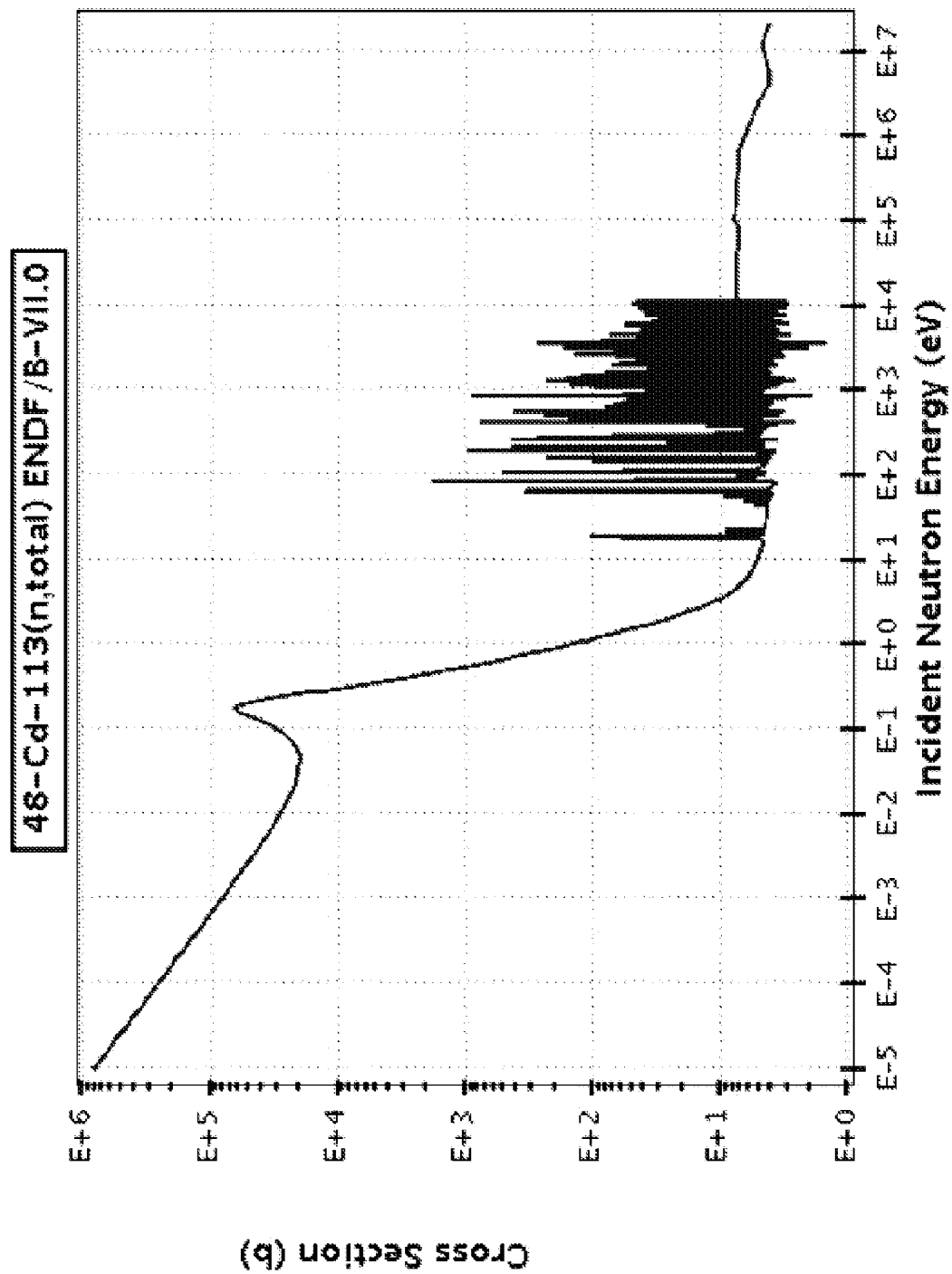
FIG. 1E is a graph of a total neutron capture cross-sectional area as a function of incident neutron energy for $^{113}$Cd.
Figure 1F:
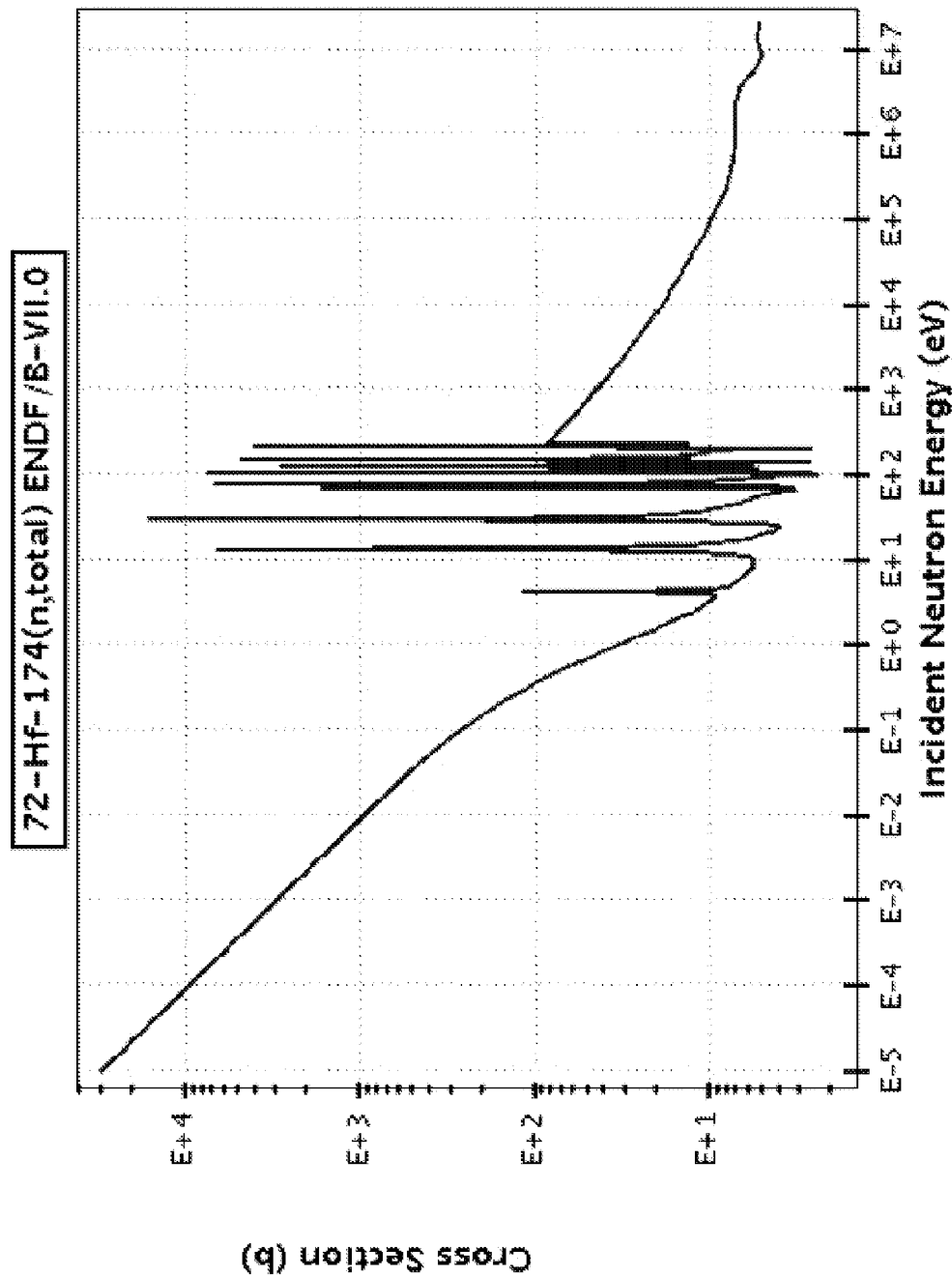
FIG. 1F is a graph of a total neutron capture cross-sectional area as a function of incident neutron energy for $^{174}$H.
Figure 1G:
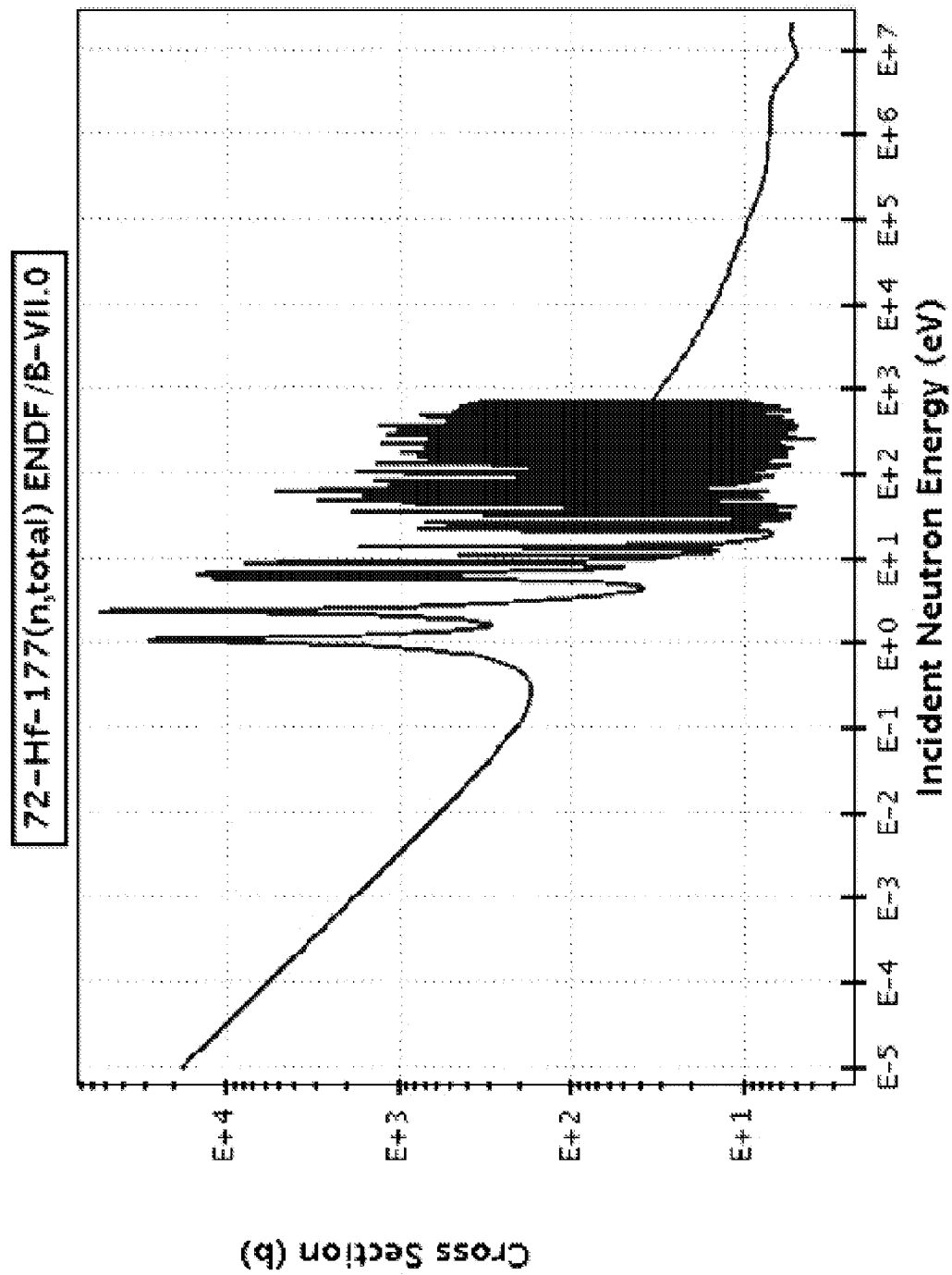
FIG. 1G is a graph of a total neutron capture cross-sectional area as a function of incident neutron energy for $^{177}$Hf.
Figure 1H:
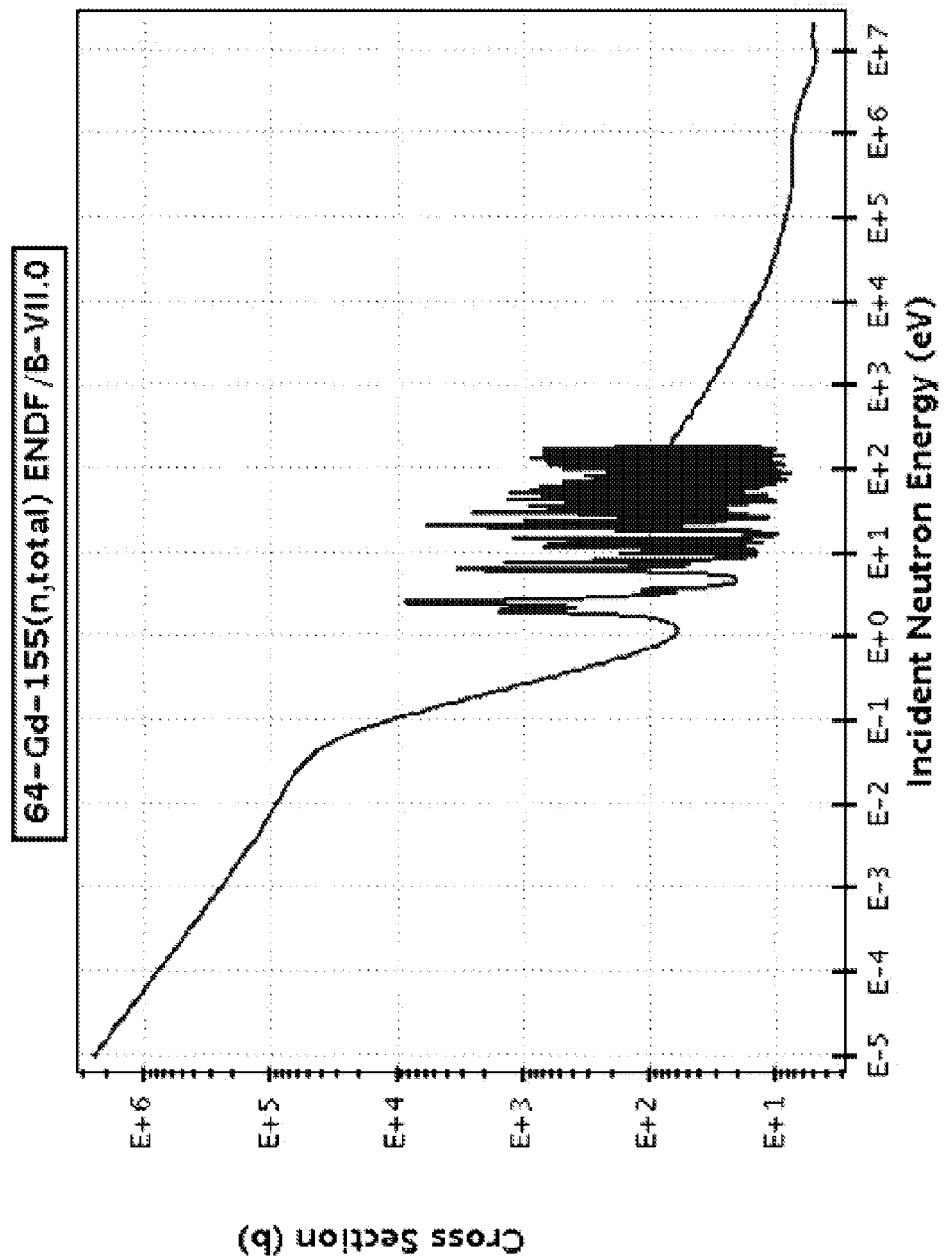
FIG. 1H is a graph of a total neutron capture cross-sectional area as a function of incident neutron energy for $^{155}$Gd.
Figure 1I:
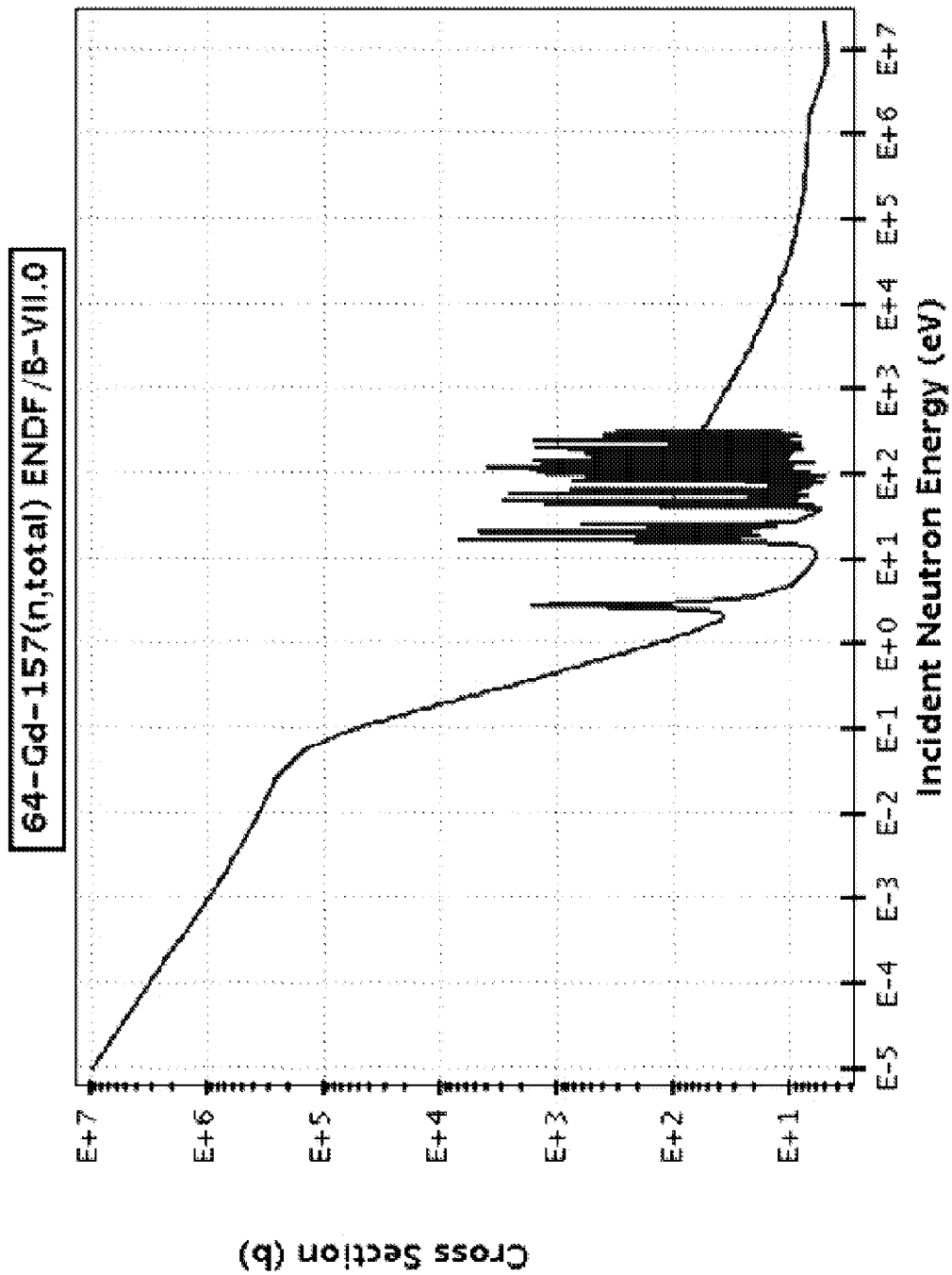
FIG. 1I is a graph of a total neutron capture cross-sectional area as a function of incident neutron energy for $^{157}$Gd.

As stated above, the present invention relates to a neutron detector employing a porous material to enhance the detection sensitivity, and methods of operating the same, which are now described in detail with accompanying figures. It is noted that like and corresponding elements mentioned herein and illustrated in the drawings are referred to by like reference numerals. It is also noted that proportions of various elements in the accompanying figures are not drawn to scale to enable clear illustration of elements having smaller dimensions relative to other elements having larger dimensions.

As used herein, a gamma ray (g-ray) is an electromagnetic radiation having an energy greater than 120 keV. A γ-ray has a wavelength less than about 0.01 nm.

As used herein, a "neutron detector" is a detector capable of detecting the presence of a neutron.

As used herein, a "maximum dimension" of an element refers to a maximum possible linear distance between a point on said element and another point on said element.

As used herein, a "nanoparticle" is a particle having a maximum dimension from 1 nm to 1 micron.

As used herein, a "thermal-neutron absorbing material" is a material having a total neutron capture cross-sectional area greater than $10^3$ barns at 0.0025 eV, which is the thermal kinetic energy of a neutron at room temperature.

As used herein, an element is "substantially spherical" if the entire surface of said element can be placed between a first ideal sphere having a first diameter and a second ideal sphere having a second diameter that is 2 times said first diameter.

As used herein, a "diameter" of a substantially spherical element is the diameter of a sphere that has the same volume as said substantially spherical element.

Figure 2:
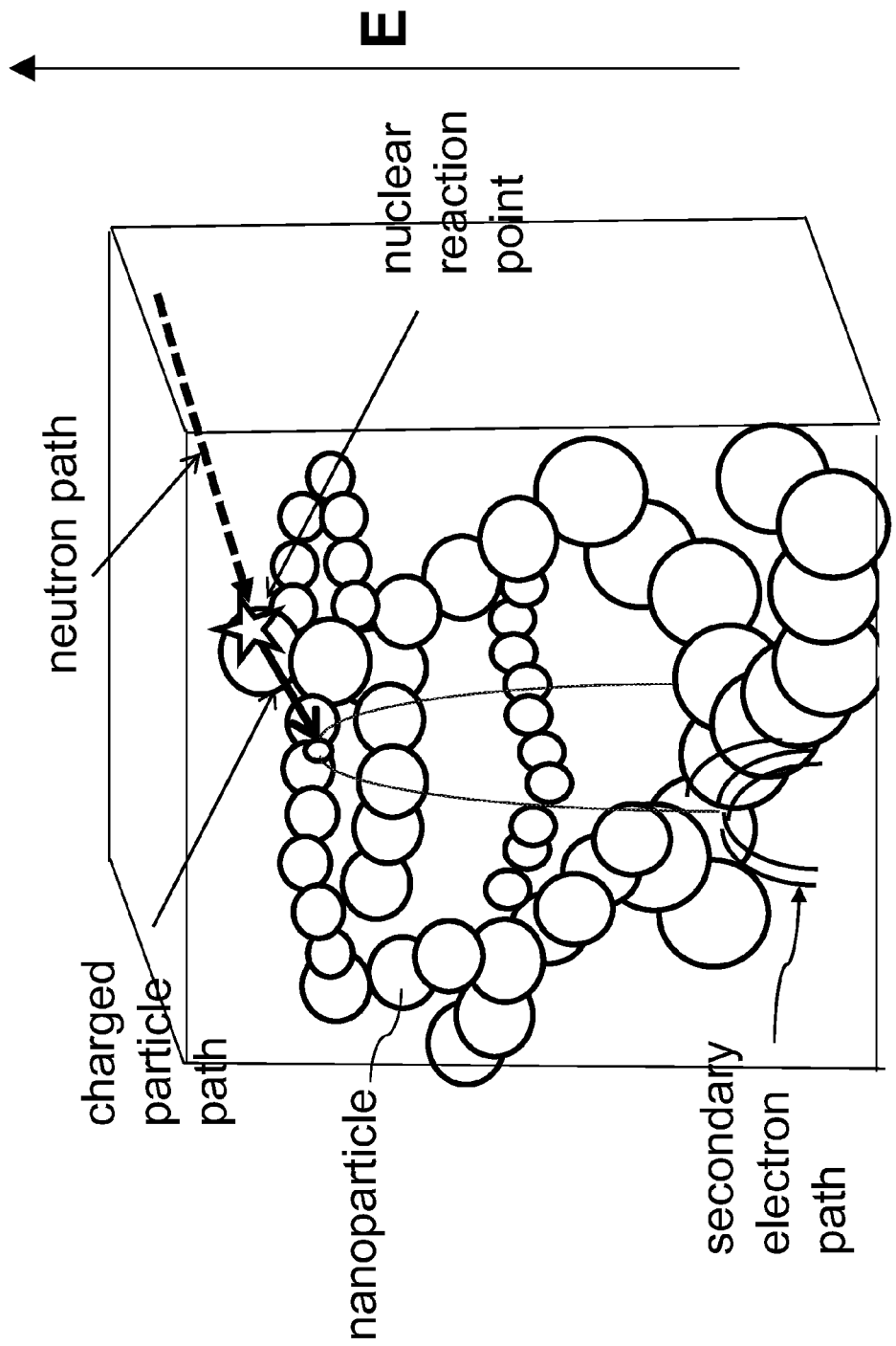
FIG. 2 a three-dimensional snapshot of the physical phenomenon of the neutron capture in a porous material layer.

Referring to FIG. 2, a schematic diagram illustrates the cascading mechanism of electron multiplication in a porous material layer according to an embodiment of the present invention. The porous material layer includes nanoparticles and pores among the volumes of the nanoparticles. The nanoparticles have a maximum dimension from 1 nm to 1 micron, and preferably from 3 nm to 300 nm, and more preferably from 10 nm to 100 nm. In one embodiment, the porous material layer may include a neutron active aerogel, i.e., an aerogel that includes a material that captures neutrons.

The nanoparticles can be "substantially spherical," i.e., the entire surface of each nanoparticle can be placed between a first ideal sphere having a first diameter and a second ideal sphere having a second diameter that is 2 times said first diameter. In this case, each substantially spherical nanoparticle has a "diameter" that is the same as the diameter of a sphere that has the same volume as the corresponding nanoparticle. The diameter of each substantially spherical nanoparticle is greater than the first diameter thereof and is less than the second diameter thereof. A substantially spherical nanoparticle has a diameter from 1 nm to 1 micron, and preferably from 3 nm to 300 nm, and more preferably from 10 nm to 100 nm.

The volume between the nanoparticles constitutes the pores. In one embodiment, the entirety of the pores can be contiguously connected throughout the porous material layer. The ratio of the total pore volume to the total volume of the nanoparticles within the porous material layer depends on the regularity of the shape of the nanoparticles and the size distribution of the nanoparticles, and can be from 0.2 to 2, and typically from 0.5 to 1.0.

The nanoparticles include a thermal-neutron absorbing material, which is a material having a total neutron capture cross-sectional area greater than $10^3$ barns at 0.0025 eV. In other words, the atoms in the porous material layer have an average total neutron capture cross-sectional area that is greater than $10^3$ barns at 0.0025 eV. For example, the porous material layer can include at least one of $^6$Li, $^{10}$B, $^{113}$Cd, $^{174}$Hf, $^{177}$Hf, $^{155}$Gd, $^{157}$Gd, alloys thereof, and compounds thereof. Preferably, the atoms in the porous material layer includes atoms having a total neutron capture cross-sectional area that is greater than $3.0 \times 10^3$ barns at 0.0025 eV. For example, the porous material layer can include at least one of $^6$Li, $^{10}$B, $^{113}$Cd, $^{155}$Gd, $^{157}$Gd, alloys thereof, and compounds thereof.

In one embodiment, the nanoparticles can be sintered ceramic materials. For example, the porous material layer can include a multitude of small spheres sintered together into a porous plate. Exemplary sintered materials include boron carbide, boron nitride, and Gd-based materials. The sintered materials may have a natural distribution of isotopes, or can include a higher percentage of an isotope having a greater total neutron capture cross-sectional area such as $^6$Li, $^{10}$B, $^{113}$Cd, $^{174}$Hf, $^{177}$Hf, $^{155}$Gd, and $^{157}$Gd.

When the porous material layer is employed as a neutron detector, the porous material layer functions as a porous neutron converter in which the detection of a reaction of a neutron with the material of the nanoparticles induces generation of electrons. Due to the stochastic geometries of the nanoparticles within the porous material layer, the electron produced by a neutron capture diffuse randomly through the porous structure, which lead to a lateral spread of the output charge cloud. The released electron from the neutron capture initially scatters isotropically but with no preferential direction after each collision.

The applied electric field E, which is in the direction toward the source of the neutron, however, increases the momentum of the electrons as the electrons travel in the direction away from the source of the neutron. Each electron accelerates in the direction opposite to the direction of the electric field lines until the electron collides with another nanoparticle within the porous material layer. No electron multiplication is required during the transit of the electrons between successive collisions. Upon impact of an accelerated electron with another nanoparticle in the path of the accelerated electron, electron multiplication occurs as additional electrons are emitted from the point of impact into the pores around the point of impact.

Because the applied electric field is neutralized inside a metal or substantially diminished in a dielectric material, electrons that travel inside a particle does not generate additional electrons. In contrast, electrons that travel through pores acquire additional energy as the electrons accelerate in the applied electric field. In general, the probability that an electron is lost within a particle increases with the dimension of the particle, and the probability that an electron exits a particle into a pore for further acceleration and a subsequent collision with another particle decreases with the dimension of the particle. Consequently, electron multiplication is enhanced if the distance electrons need to travel to reach a pore is short, but retarded as the distance electrons need to travel to reach a pore is long. By limiting the maximum dimension of nanoparticles to a distance less than 1 micron, and preferably less than 300 nm, and more preferably less than 100 nm, a high percentage of secondary electrons generated by an impinging gamma radiation or an impinging electron travel to an adjacent pore, accelerates in the applied electric field within the pore, and impinges on another nanoparticle after acceleration. By limiting the maximum dimension of nanoparticles to be less than 1 micron, the relatively small size of the nanoparticles increases the probability for each secondary electron not to be absorbed inside a nanoparticle that generates the secondary electron.

A material that has a large total neutron capture cross-sectional area is isotope $^{10}$B, which undergoes one of the two reactions below upon capture of a neutron.

$$n + {}^{10}B \rightarrow {}^{7}Li^* + {}^{4}He \rightarrow {}^{7}Li + {}^{4}He + 0.48 \text{ MeV } \gamma\text{-ray} + 2.3 \text{ MeV kinetic energy (93\%)} \quad (1)$$

$$n + {}^{10}B \rightarrow {}^{7}Li^* + {}^{4}He \rightarrow {}^{7}Li + {}^{4}He + 2.79 \text{ MeV kinetic energy (7\%)} \quad (2)$$

Reaction 1 occurs with a 93% probability and reaction (2) occurs with a 7% probability. The products ($^{7}$Li and $^{4}$He) resulting from the nuclear reactions are emitted co-linearly while ionizing within ten microns of the reaction point within the porous material layer. Materials such as boron carbide and AlB$_{12}$ meet this requirement. In addition, boron carbide and AlB$_{12}$ are low Z material with low solid densities. Therefore, the gamma ray sensitivity of boron carbide and AlB$_{12}$ is inherently low, i.e., these materials are insensitive to gamma ray in neutron detection.

Some other materials that have a large total neutron capture cross-sectional area are isotopes if gadolinium, i.e., $^{155}$Gd or $^{157}$Gd, or a natural composition of Gd. $^{155}$Gd has a total neutron capture cross-sectional area at 0.0025 eV of about 2.55×10$^5$ barns, 6.14×10$^4$ barns, and 4.92×10$^4$ barns, respectively. This direct conversion converter offers high electron conversion coefficients. The ejected electrons that have an energy between 29 keV and 131 keV are stopped within less than 2 microns (for $^{157}$Gd), thereby allowing a better position resolution.

If Gd-based granules are employed for the nanoparticles in the porous material layer of the present invention, the maximum dimension of Gd-based granules or particle sizes can vary from 1 nm to 1 micron. Since a resistive film is required in order to have a good electric field penetration inside the porous material layer, Gd/Gd$_2$O$_3$ can be prepared to have sheet resistance ranging from 1 kOhm/sq to 1 MOhm/sq. This can be achieved in a manner similar to a cermet solely by changing the volume fraction of the Gd$_2$O$_3$ in the porous material layer.

In a neutron detector employing a Gd-based porous material layer, the electrons generated from internal neutron conversion have different conduction mechanisms depending on whether the size of the nanoparticles. As the nanoparticle size becomes relatively large, the bulk electrical properties of the nanoparticle dominate. As the nanoparticle size becomes relatively small, the tunneling barriers model better describes the bulk electrical properties of the nanoparticle. For example, for small nanoparticle sizes, the Gd-based porous material layer should be thick enough to have high neutron absorption efficiency. At the same time, the Gd-based porous material layer should be porous enough to allow a long electron mean free path since the electron transport occurs by quantum tunneling and hopping between nanoparticles.

Figure 3:
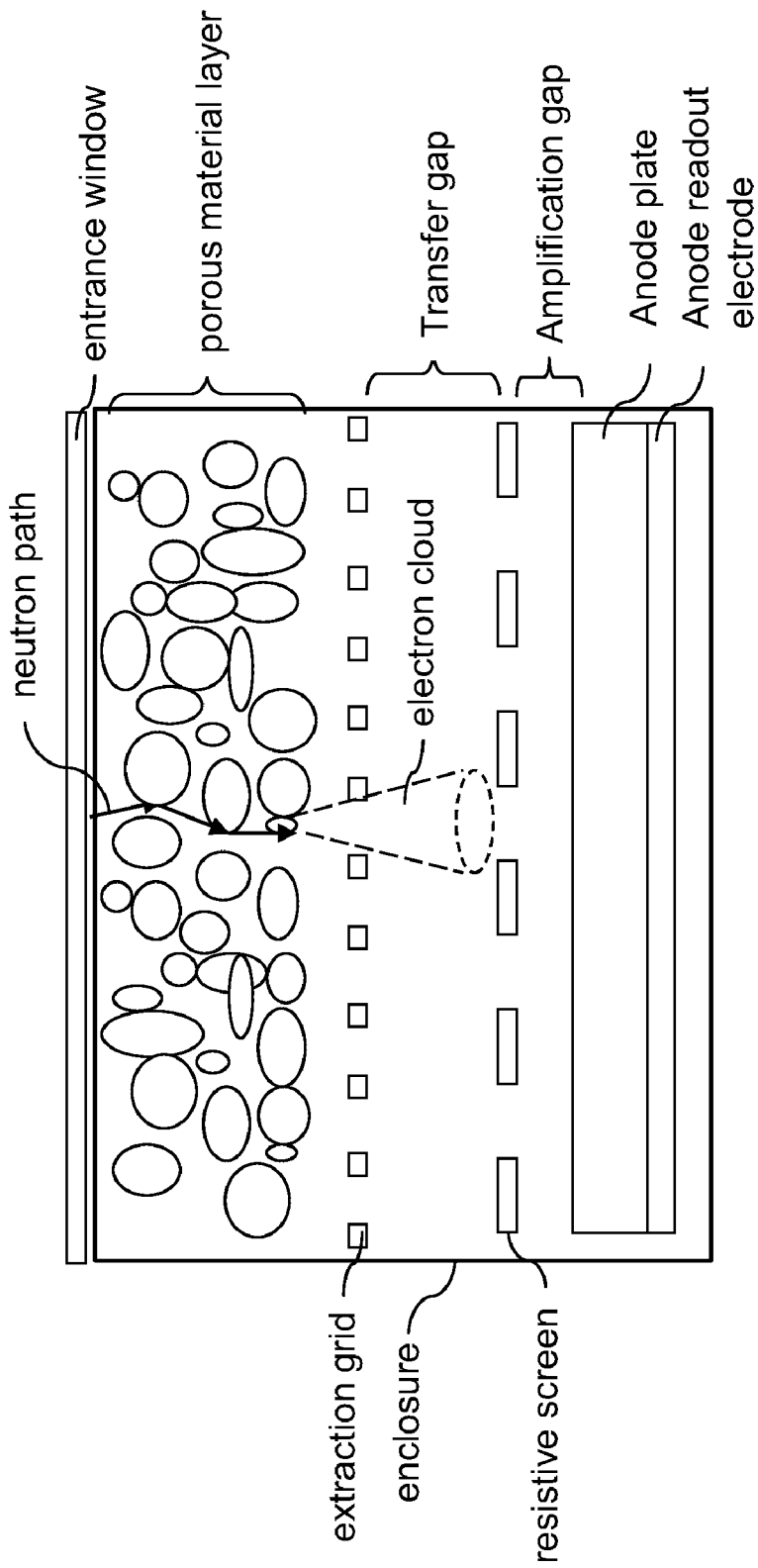
FIG. 3 is a schematic cross-sectional view of an exemplary neutron detector according to an embodiment of the present invention.

Referring to FIG. 3, an exemplary neutron detector according to an embodiment of the present invention includes, from top to bottom, an entrance window, a porous material layer, and an electron amplification device located in an enclosure. The porous material layer includes nanoparticles and pores as discussed above. The nanoparticles have the same composition and geometry as discussed above. The entrance window includes a material that has a small total neutron capture cross-sectional area to minimize loss of incoming electrons before detection. The thickness of the entrance window is minimized to minimize a neutron capture.

As illustrated, the porous material layer can be located within an enclosure behind the entrance window. In this case, an ambient gas can be present in the enclosure having a sub-atmospheric pressure ambient. The operating gas pressure of the ambient gas in the sub-atmospheric pressure ambient is low enough to allow the drifting electrons to be energetic enough between two successive collisions. For example, the pressure of the ambient gas can be 1×10$^{-8}$ Torr to 5 Torr, and typically from 1×10$^{-6}$ Torr to 1×10$^{-2}$ Torr, although lesser and greater pressures can also be employed.

In case a nanoparticle has a spherical shape, the resistivity P of such a nanoparticle, which is a nanosphere particles, is given by:

$$\rho = \rho_\infty \frac{\exp\left(-\dfrac{E}{E_0}\right)}{\left[\displaystyle\int_{-\frac{E_0}{E}}^{\infty} \frac{Z\exp(-Z)}{1 - \exp\left\{-\dfrac{Z}{Z + \dfrac{E_0}{E}} \dfrac{qE\omega}{kT}\right\}} dZ\right]} \quad (3)$$

where $\rho_\infty$ is a material constant, E is the applied electric field, k the Boltzman constant, T is the temperature and $E_0=C/e\omega$, where C is the capacitance between adjacent particles, q is the electron charge and $\omega$ the mean separation between particles.

At the limit of a strong electric fields in which $qE\omega \gg kT$, the equation (3) becomes:

$$\rho = \rho_\infty \exp\left(-\frac{E}{E_0}\right) \quad (4)$$

This implies that the resistivity of this porous converter material is a weak function of the temperature at sufficiently high electric fields. In other words, in the high field regime, tunneling is almost completely driven by the electric field rather than by thermal activation in a standard semiconductor. So a neutron detector, made of a porous material layer including nanoparticles, can be operated at a low resistivity in order to achieve a high count rate capability without the risk of thermal runaway instabilities seen in conventional microchannel plate detectors.

The nanoparticles in the porous material layer have a secondary electron emission coefficient greater than 1.0 at the operation conditions. Preferably, the nanoparticles in the porous material layer have a high secondary electron emission coefficient (e.g., secondary electron emission coefficient greater than 4.0) at the operation conditions. This can be achieved either by selecting the material of the nanoparticles among materials having a high secondary electron emission coefficient, or by coating the nanoparticles with a secondary electron emitter material such as MgO or CsI. In case a secondary electron emitter material is coated on the nanoparticle, the thickness of the coating is from 0.1% to 20%, and typically from 0.5% to 5% of the maximum dimension of the nanoparticles. Preferably, the material for the nanoparticles and/or the material for the secondary electron emitter material are selected to avoid surface charging so that the neutron detector may be operated for pulsed neutron beam detection and fast time-resolved techniques.

The electrons exiting the porous material layer can be detected by any device that detects electrons. In a preferred embodiment, the electrons exiting the porous material layer are amplified by an electron amplification device that multiplies electrons. In other words, the electron charge cloud coming from the porous material layer, which functions as a neutron-to-electron converter, can employ an amplification structure to be registered by the readout electronics.

While various parallel plate avalanche counter structures have been designed for the gas amplification in the prior art, the prior art parallel plate avalanche counter structures either use insulators in the sensitive area, which makes the avalanche prone to charging or discharges at high rate, or use a resistive anode with large gap on the order of a millimeter, which increases the charge collection time to tens of nanoseconds for the electrons and few microseconds for the ions, i.e., makes the response time of the avalanche counter relatively long and renders the avalanche counter unsuitable for high count rates.

In order to overcome such disadvantages in the prior art parallel plate avalanche detector, an electron multiplication device is provided that provides a fast collection time and does not employ an insulator or a conductor over large sensitive areas according to an embodiment of the present invention. The electron multiplication device of the present invention is an amplification structure for amplifying the signal in the form of an electron cloud that exits the porous material layer by orders of magnitude into a flux of electrons impinging on a readout electrode.

The electron multiplication device includes an enclosure, which is filled with an ambient gas including an inert gas selected from He, Ne, Ar, Kr, and Xe. Typically, the ambient gas further includes carbon dioxide at a molar concentration of 0.5% to 5.0%. The inert gas has a molar concentration from 95% to 99.5%. In general, any standard gas mixture is compatible with the instant electron amplification device. Typically working gas mixtures include $Ar-CO_2$ and $Xe-CO_2$.

The electron multiplication device further includes two electrodes, which includes an extraction grid located proximally to the porous material layer and an anode plate located distally from the porous material layer, i.e., farther away from the porous material layer. The anode plate is positively biased relative to the extraction grid and relative to the exit side of the porous material layer. Optionally, the electron multiplication device may further include a resistive screen, which is located between the porous material layer and the anode plate. Specifically, the resistive screen is located between the extraction grid and the anode plate, and is positively biased relative to the extraction grid and negatively biased relative to the anode plate. Typically, the extraction grid is positively biased relative to the exit side of the porous material layer. Further, the resistive screen is electrically biased at a voltage between the voltage at the anode plate and the voltage at the extraction grid. The anode plate, the resistive screen, and the extraction grid are located within the enclosure.

The region between the resistive screen and the extraction grid is referred to as a conversion region. The region between the resistive screen and the anode plate is herein referred to as an amplification gap. Thus, the resistive screen is electrically biased at a voltage between the voltage at the anode plate and the voltage at an exit side of the porous material layer. Thus, the direction of the electrical field is from the anode plate to the resistive screen, from the resistive screen to the extraction grid, and from the extraction grid to the exit side of the porous material layer.

An electron cloud that comes out of the porous material layer can be considered as a point-like charge near the entrance into the enclosure. As the electron cloud diffuses while drifting toward the amplification structures just below the extraction grid. The diffusion width, $\sigma$, of the electron charge cloud is given by:

$$\sigma = 2\sqrt{\frac{\varepsilon d}{3qE}} \quad (5)$$

Where d is the drift distance, E the drift field and q the electron charge and the $\in$ electron energy. This implies that the electron energies and the drift field can be adjusted by the gas pressure and the applied voltage. Therefore, the diffusion width of the electron cloud can be optimized in order to obtain a better spatial resolution. In other words, the pixel resolution of the electron multiplication device can be limited by adjusting d/E.

The electron multiplication device further includes an anode plate and a readout electrode. Typically, the anode plate has a sheet resistance between 10 kOhm/sq and 1 GOhm/sq so that the anode plate provides a sufficiently uniform electrostatic potential and allows a fast charge dissipation and hence a high achievable count rate, while at the same time directing the electrons to the readout electrode and limiting the lateral flow of current within the anode plate. A resistive anode plate, i.e., an anode plate with a limited electrical conductivity, can significantly decrease the spark rate in the amplification gap, which is the volume of the enclosure between the anode plate and the resistive screen. The electron amplification device includes a readout electrode, which includes an array of pixels that generate an electrical signal upon incidence of electrons on an adjacent region of the anode plate. This anode plate can be kept at ground potential, or at a positive voltage and be free of partial discharges.

The electron amplification device of the present invention is a parallel plate avalanche chamber that amplifies electrons exiting the porous material layer by generating an electron cloud including more electrons than the electrons exiting the porous material layer. The thickness of the resistive screen can be from 25 microns to 500 microns. The distance between the resistive screen and the anode plate can be from 100 microns to 2,000 microns. The magnitude of the electrical field applied between the resistive screen and the anode plate can be from 3 kV/cm to 300 kV/cm. The distance between the resistive screen and the extraction grid can be from 25 microns to 200 microns, and preferably from 50 microns to 100 microns. The magnitude of the electrical field applied between the resistive screen and the extraction grid can be from 1 kV/cm to 100 kV/cm. Under optimal operating conditions of the electron amplification device, the total number of electrons in the electron cloud that reaches the anode plate can be greater than the total number of the electrons exiting the porous material layer by a factor from 100 to 10,000. If the total number of electrons exiting the porous material layer is from 1,000 to 100,000, the total number of electrons at the anode plate can be typically from 100,000 to 10,000,000.

Figure 4:
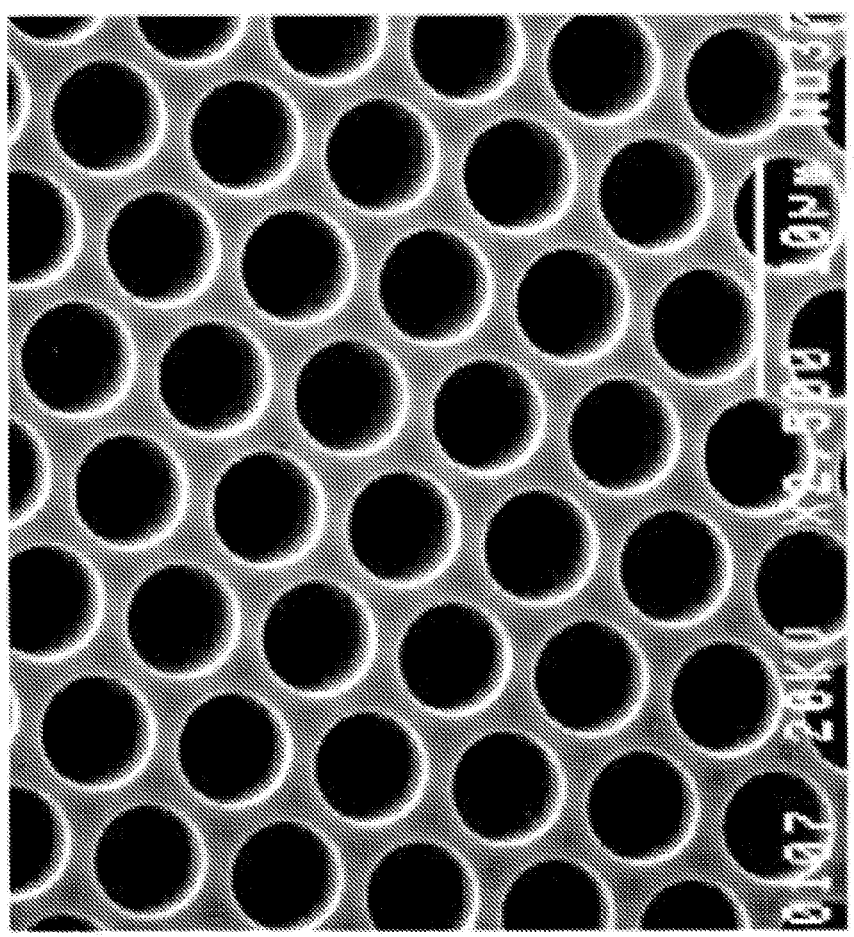
FIG. 4 is a top-down view of a resistive screen with microchannels therein according to an embodiment of the present invention.

Referring to FIG. 4, a resistive screen with microchannels therein is shown according to an embodiment of the present invention. The microchannels are an array of apertures that lets electron clouds to pass through, while suppressing amplification of secondary electrons that are emitted from the surface of the anode plate when an electron cloud reaches the anode plate. By providing an electrostatic potential that is negative relative to the anode plate to the resistive screen, electrons that are accidentally emitted from the anode plate are driven back toward the anode plate, thereby preventing further amplification of these electrons.

The resistive screen can be made of a resistive material that has a resistivity from 1 Ohm-cm to 1 GOhm-cm, and preferably from 100 kOhm-cm to 1 MOhm-cm. The resistive screen can have a resistance between 10 kOhm and 1 GOhm, and typically from 100 kOhm to 100 MOhm. For example, a conductive doped glass material or a coated or uncoated metal can be employed for the resistive screen. If the metal is coated, the coating can include a conductive doped glass material. The resistive screen allows electrical charges to pass through, and does not require any gas amplification.

The resistive screen provides better mechanical stability than a woven wire mesh or an etched screen. Thus, the resistive screen can have a better surface finish, which is important for both the detector stability and the uniformity of gain. For large sensitive areas (detector areas), a thicker resistive plate can be employed, in which case the walls of the capillary arrays can have resistive properties (as used for drift tubes and high voltage dividers) to create uniform electric fields of unique shapes in order to guide or direct the primary electrons to the amplification gap. In addition, compared to prior art metallic cathodes that are currently available, this conductive glass can have a higher work function and a lower secondary electron emission yield, which are very important characteristics to suppress the photoemission from the avalanche ultraviolet radiation seen in all gaseous detectors at high gas gain.

In case a resistive glass is employed for the resistive screen, the resistive screen can have a resistance between 10 kOhm and 1 GOhm. Further, the surface of the resistive screen can have sub-micron flatness and provide a higher uniform gas gain over a large area by avoiding high electric field concentration. The resistive screen made of a resistive glass according to the present invention does not sag due to electrostatic forces, which is observed in prior art wire meshes. Further, pillars or any insulating material structures are not needed in the sensitive area of the of the anode plate. Yet further, 100% of the total electrical charge can be collected in tens of nanoseconds. Such high collection efficiency of the electron amplification device of the present invention contrasts with collection efficiencies of about 5% collection rate in prior art resistive anode detectors in a fast collection mode.

Still further, the resistive screen employing the resistive glass can stabilize the operation of the instant electron amplification device and allow an increase in the gain without inducing sparking. This is because the use of a resistive glass plate for the resistive screen reduces the secondary electron photoemission from the resistive screen. Because of the suppression of generation of secondary electrons by the resistive screen, even if electrical discharges occur in the amplification zone, the readout electronics of the instant electron amplification device are protected against damage.

This spark protected electron amplification device can operate with both a solid neutron-to-electron converter as provided in an embodiment of the instant invention. Further, this spark protected electron amplification device can also be operated with a prior art solid neutron-to-electron converter or a prior art gas neutron-to-electron converter. The resistive screen and the anode plate enables operation of the spark protected electron amplification device without an insulator structure or a conductor structure in the sensitive area of the electron amplification device.

The resistive screen functions as a voltage divider between the extraction grid and the anode plate as electrons are transferred from the conversion region to the amplification gap. The resistive screen functions as a transfer structure that provides a uniform electric field in the micro channel therein. The presence of the resistive screen allows independent adjustment of the magnitude of the electric field in the conversion region and the magnitude of the electric field in the amplification gap. Thus, the electric field in the conversion region can be adjusted to maximize resolution of the image at the readout electrode, while the electric field in the amplification gap can be adjusted to maximize the gain of the electron amplification device. Further, the use of a resistive glass on the resistive screen and the optional use of the resistive glass on the anode suppress emission of secondary electrons, thereby increasing the gain of the electron amplification device.

While the present invention is best practiced with the spark protected electron amplification device according to an embodiment of the present invention, any parallel plate avalanche chamber structure can be employed in conjunction with the solid neutron-to-electron converter structure that includes the stack of the entrance window, and the porous material layer. Exemplary prior art parallel plate avalanche chambers include Gas Electron Multiplier (GEM)™, MicroMegas™, Resistive Anode Avalanche Chamber™, and wire chambers known in the art.

The readout electrodes can be of any conventional types including delay-lines, crossed strips or pixels. This proposed detector is therefore versatile and can find applications in neutron scattering, neutron imaging, neutron emitting nuclear materials, X-ray and in high energy particle detections.

The combination of the solid neutron-to-electron converter and the electron amplification device as shown in FIG. 3 provide higher stopping power, higher absorption efficiency and therefore higher quantum efficiency, and low parallax broadening due to the small conversion depth compared to gaseous converter known in the prior art. At the same time, the combination of the solid neutron-to-electron converter and the electron amplification device as shown in FIG. 3 does not require any pressurized chamber or $^3$He gas, which is difficult to obtain.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A neutron detector comprising a porous material layer and an electron amplification device, wherein said electron amplification device includes an anode plate positively biased relative to an exit side of said porous material layer, wherein said porous material layer includes nanoparticles and pores thereamongst, wherein said nanoparticles include a thermal-neutron absorbing material, and wherein said electron amplification device multiplies electrons that exit said porous material layer, wherein said porous material layer is located within an enclosure having a sub-atmospheric pressure ambient.

2. The neutron detector of claim 1, wherein atoms in said porous material layer include atoms having a total neutron capture cross-sectional area that is greater than $30 \times 10^3$ barns at 0.0025 eV.

3. The neutron detector of claim 2, wherein said porous material layer includes at least one of $^6$Li, $^{10}$B, $^{113}$Cd, $^{155}$Gd, and $^{157}$Gd.

4. The neutron detector of claim 1, wherein a ratio of a total pore volume to a total volume of said nanoparticles within said porous material layer is from 0.2 to 2.

5. The neutron detector of claim 4, wherein said nanoparticles are substantially spherical.

6. The neutron detector of claim 5, wherein said nanoparticles have a diameter from 1 nm to 1 micron.

7. The neutron detector of claim 6, wherein said nanoparticles have a diameter from 3 nm to 300 nm.

8. The neutron detector of claim 7, wherein said nanoparticles have a diameter from 10 nm to 100 nm.

9. The neutron detector of claim 1, wherein said porous material layer has a thickness from 0.3 mm to 30 cm.

10. The neutron detector of claim 1, wherein a secondary electron emitter material is coated on said nanoparticles.

11. The neutron detector of claim 10, wherein a thickness of a coating of said secondary electron emitter material is from 0.1% to 20% of a maximum dimension of said nanoparticles.

12. The neutron detector of claim 10, wherein said secondary electron emitter material is selected from MgO, CsI, or a combination thereof.

13. The neutron detector of claim 1, wherein said anode plate is located in an enclosure containing an ambient gas including an inert gas selected from He, Ne, Ar, Kr, and Xe.

14. The neutron detector of claim 13, wherein said ambient gas further includes carbon dioxide at a molar concentration of 0.5% to 5.0%.

15. The neutron detector of claim 1, wherein said anode plate has a sheet resistance between 10 kOhm/sq and 1 GOhm/sq.

16. The neutron detector of claim 1, wherein said electron multiplication device further includes a resistive screen located between said porous material layer and said anode plate, wherein said resistive screen is electrically biased at a voltage between a voltage at said anode plate and a voltage at an exit side of said porous material layer.

17. The neutron detector of claim 16, wherein said resistive screen has an array of apertures.

18. The neutron detector of claim 16, wherein said resistive screen includes a resistive glass and has a resistance between 10 kOhm and 1 GOhm.

19. The neutron detector of claim 1, further comprising a readout electrode including an array of pixels that generate an electrical signal upon incidence of electrons on an adjacent region of said anode plate.

20. The neutron detector of claim 1, wherein said electron amplification device is a parallel plate avalanche chamber that amplifies electrons exiting said porous material layer by generating an electron cloud including more electrons than said electrons exiting said porous material layer.

21. The neutron detector of claim 20, wherein a total number of electrons in said electron cloud that reaches an anode plate is greater than a total number of said electrons exiting said porous material layer by a factor from 1,000 to 10,000,000.

22. The neutron detector of claim 1, wherein an ambient gas is present in said sub-atmospheric pressure ambient.

23. The neutron detector of claim 1, wherein said ambient gas includes at least one of He, Ne, Ar, Kr, and Xe.

24. A neutron detector comprising a porous material layer that includes nanoparticles and pores thereamongst, wherein said nanoparticles include a thermal-neutron absorbing material, wherein atoms in said porous material layer have an average total neutron capture cross-sectional area that is greater than $10^3$ barns at 0.0025 eV.

25. The neutron detector of claim 24, wherein said porous material layer includes at least one of $^6$Li, $^{10}$B, $^{113}$Cd, $^{174}$Hf, $^{177}$Hf, $^{155}$Gd, and $^{157}$Gd.

26. A neutron detector comprising a porous material layer that includes nanoparticles and pores thereamongst, wherein said nanoparticles include a thermal-neutron absorbing material, wherein said nanoparticles are sintered ceramic materials.

27. A method of detecting a neutron comprising:
providing a neutron detector comprising a porous material layer including nanoparticles and pores thereamongst and located within an enclosure having a sub-atmospheric pressure ambient, wherein said nanoparticles is composed of a thermal-neutron absorbing material, wherein said neutron detector further comprises an electron amplification device that multiplies electrons that exit said porous material layer, and wherein said electron amplification device includes an anode plate positively biased relative to an exit side of said porous material layer; and
detecting a neutron by exposing said neutron detector to said neutron.

28. The method of claim 27, wherein atoms in said porous material layer includes atoms having a total neutron capture cross-sectional area that is greater than $3.0 \times 10^3$ barns at 0.0025 eV.

29. The method of claim 27, wherein a ratio of a total pore volume to a total volume of said nanoparticles within said porous material layer is from 0.2 to 2.

30. The method of claim 29, wherein said nanoparticles are substantially spherical.

31. The method of claim 30, wherein said nanoparticles have a diameter from 1 nm to 1 micron.

32. The method of claim 27, wherein a secondary electron emitter material is coated on said nanoparticles.

33. The method of claim 27, wherein said anode plate is located in an enclosure containing an ambient gas including an inert gas selected from He, Ne, Ar, Kr, and Xe.

34. The method of claim 27, wherein said electron multiplication device further includes a resistive screen located between said porous material layer and said anode plate, wherein said method includes electrically biasing said resistive screen at a voltage between a voltage at said anode plate and a voltage at an exit side of said porous material layer.

35. The method of claim 34, wherein said resistive screen includes a resistive glass and has a resistance between 10 kOhm and 1 GOhm.

36. The method of claim 27, further comprising generating an electrical signal representing detection of said neutron employing a readout electrode, wherein said readout electrode includes an array of pixels that generate an electrical signal upon incidence of electrons on an adjacent region of said anode plate.

37. The method of claim 27, wherein said electron amplification device is a parallel plate avalanche chamber that amplifies electrons exiting said porous material layer by generating an electron cloud including more electrons than said electrons exiting said porous material layer.

38. The method of claim 37, wherein a total number of electrons in said electron cloud that reaches an anode plate is greater than a total number of said electrons exiting said porous material layer by a factor from 1,000 to 10,000,000.

39. The method of claim 27, wherein an ambient gas is present in said sub-atmospheric pressure ambient.

40. The method of claim 27, wherein said ambient gas includes at least one of He, Ne, Ar, Kr, and Xe.

41. A method of detecting a neutron comprising:
providing a neutron detector comprising a porous material layer including nanoparticles and pores thereamongst, wherein said nanoparticles is composed of a thermal-neutron absorbing material, wherein said neutron detector further comprises an electron amplification device that multiplies electrons that exit said porous material layer, wherein atoms in said porous material layer has an average total neutron capture cross-sectional area that is greater than $10^3$ barns at 0.0025 eV; and
detecting a neutron by exposing said neutron detector to said neutron.

42. A method of detecting a neutron comprising:
providing a neutron detector comprising a porous material layer including nanoparticles and pores thereamongst, wherein said nanoparticles is composed of a thermal-neutron absorbing material, wherein said neutron detector further comprises an electron amplification device that multiplies electrons that exit said porous material layer, and wherein said nanoparticles are sintered ceramic materials; and
detecting a neutron by exposing said neutron detector to said neutron.

\* \* \* \* \*